(12) United States Patent
Iijima et al.

(10) Patent No.: US 6,381,943 B1
(45) Date of Patent: May 7, 2002

(54) HIGH-EFFICIENCY POWER GENERATING METHOD

(75) Inventors: Masaki Iijima; Kazuto Kobayashi; Masahumi Moriwaki; Masatoshi Shibata; Yoshinori Hyakutake, all of Tokyo (JP)

(73) Assignee: Mitsubishi Heavy Industries, Inc., Tokyo (JP)

( * ) Notice: Subject to any disclaimer, the term of this patent is extended or adjusted under 35 U.S.C. 154(b) by 0 days.

(21) Appl. No.: 09/649,220

(22) Filed: Aug. 28, 2000

(30) Foreign Application Priority Data

Sep. 8, 1999 (JP) .......................................... 11-254242

(51) Int. Cl.$^7$ ................................................. F02C 3/20
(52) U.S. Cl. .................... 60/39.02; 60/39.12; 60/39.182
(58) Field of Search .............................. 60/39.02, 39.12, 60/39.182

(56) References Cited

U.S. PATENT DOCUMENTS 5,052,175 A  * 10/1991  Brueckner et al. ....... 60/39.463

FOREIGN PATENT DOCUMENTS

| GB | 1020667 | 2/1966 |
|----|---------|--------|
| JP | 9-317407 | 12/1997 |

* cited by examiner

*Primary Examiner*—Charles G. Freay
*Assistant Examiner*—Ehud Gartenberg

(57) ABSTRACT

In a high-efficiency power generating method to generate electric power by an exhaust gas re-combustion system using at least a gas turbine, a boiler, and a steam turbine, crude oil or heavy oil is heated with steam obtained from the boiler; the crude oil or heavy oil is distilled under reduced pressure; and electric power is generated by using an obtained light oil fraction as a gas turbine fuel and by using a heavy oil fraction as a boiler fuel.

3 Claims, 6 Drawing Sheets

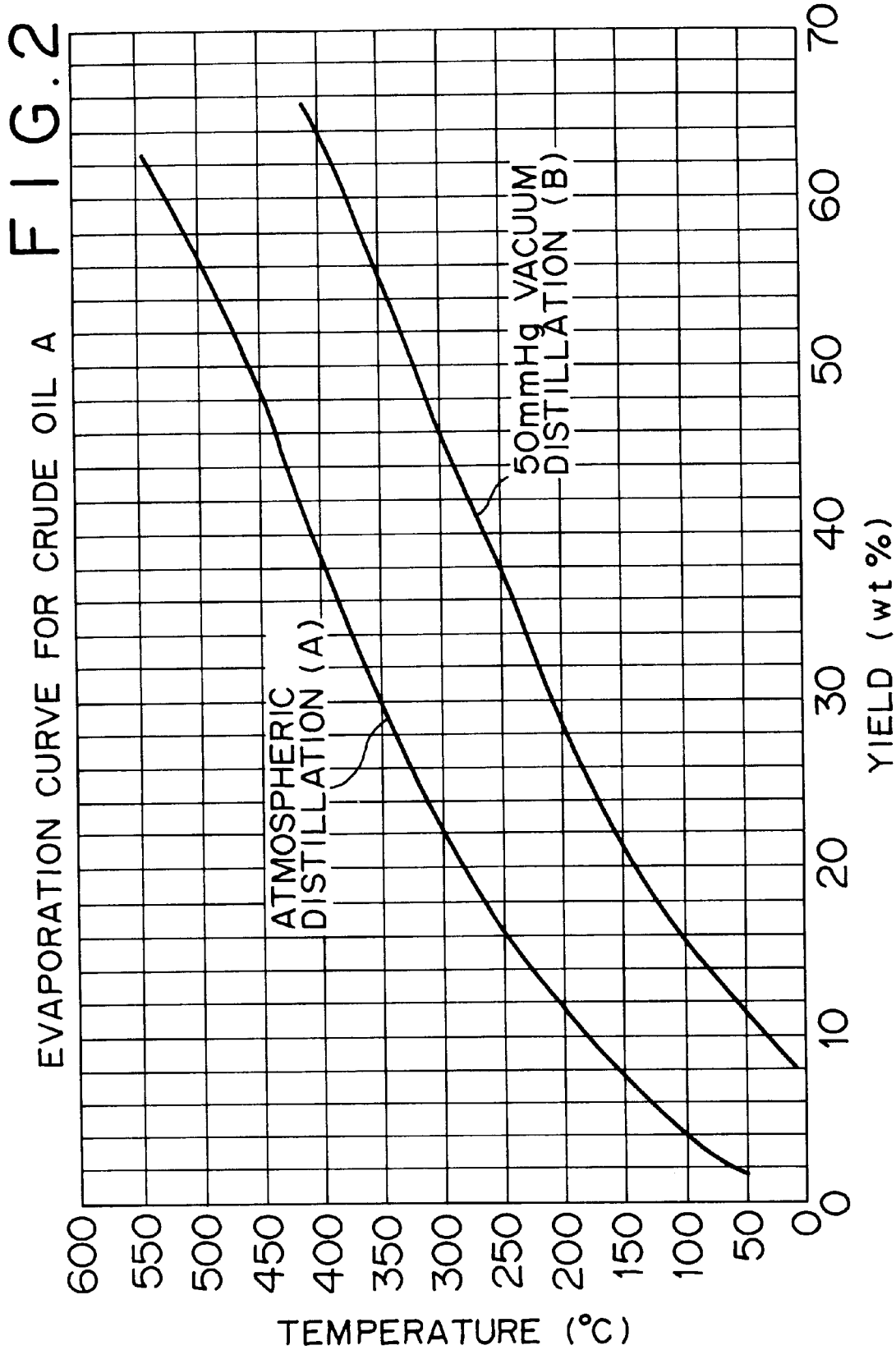

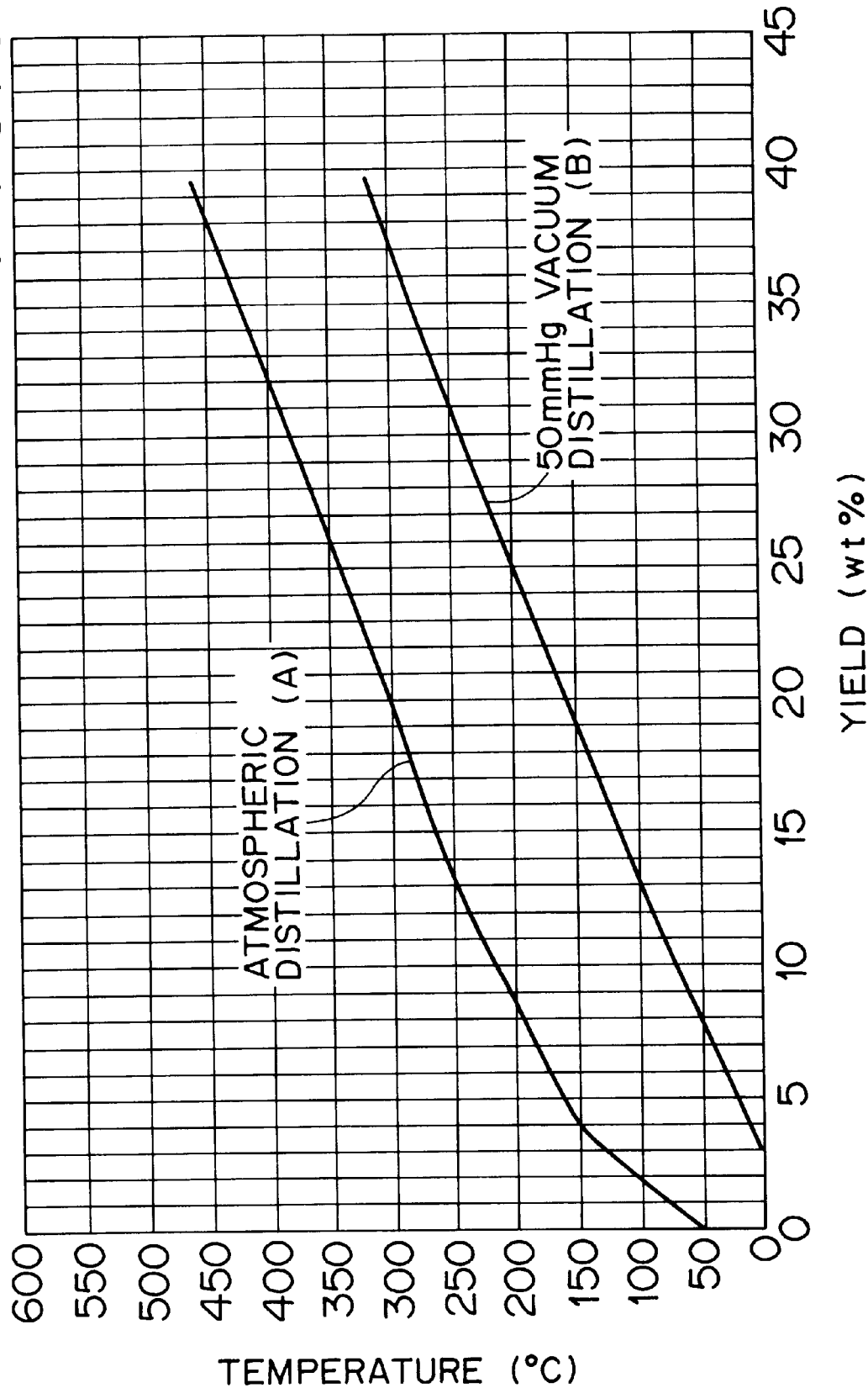

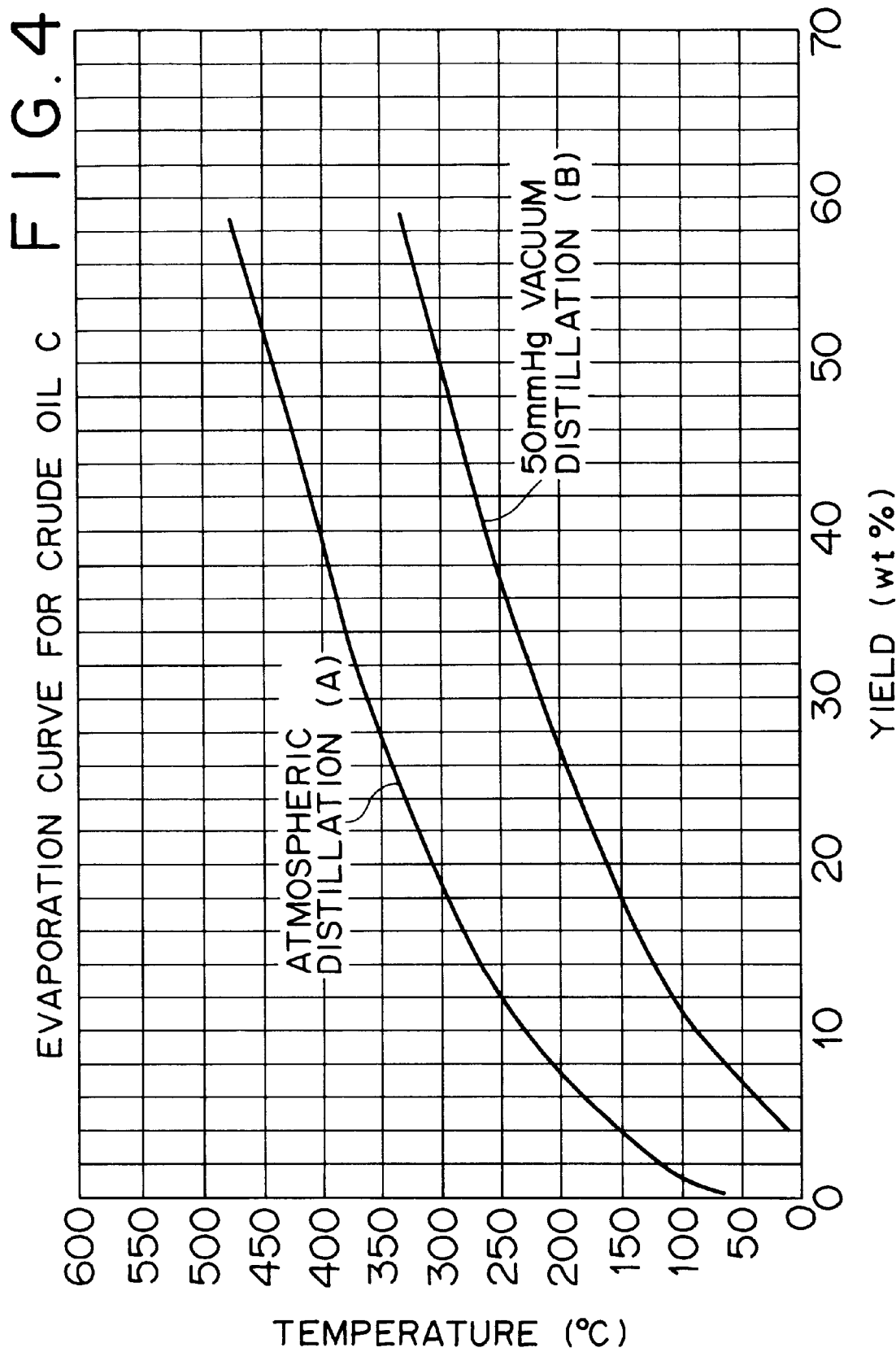

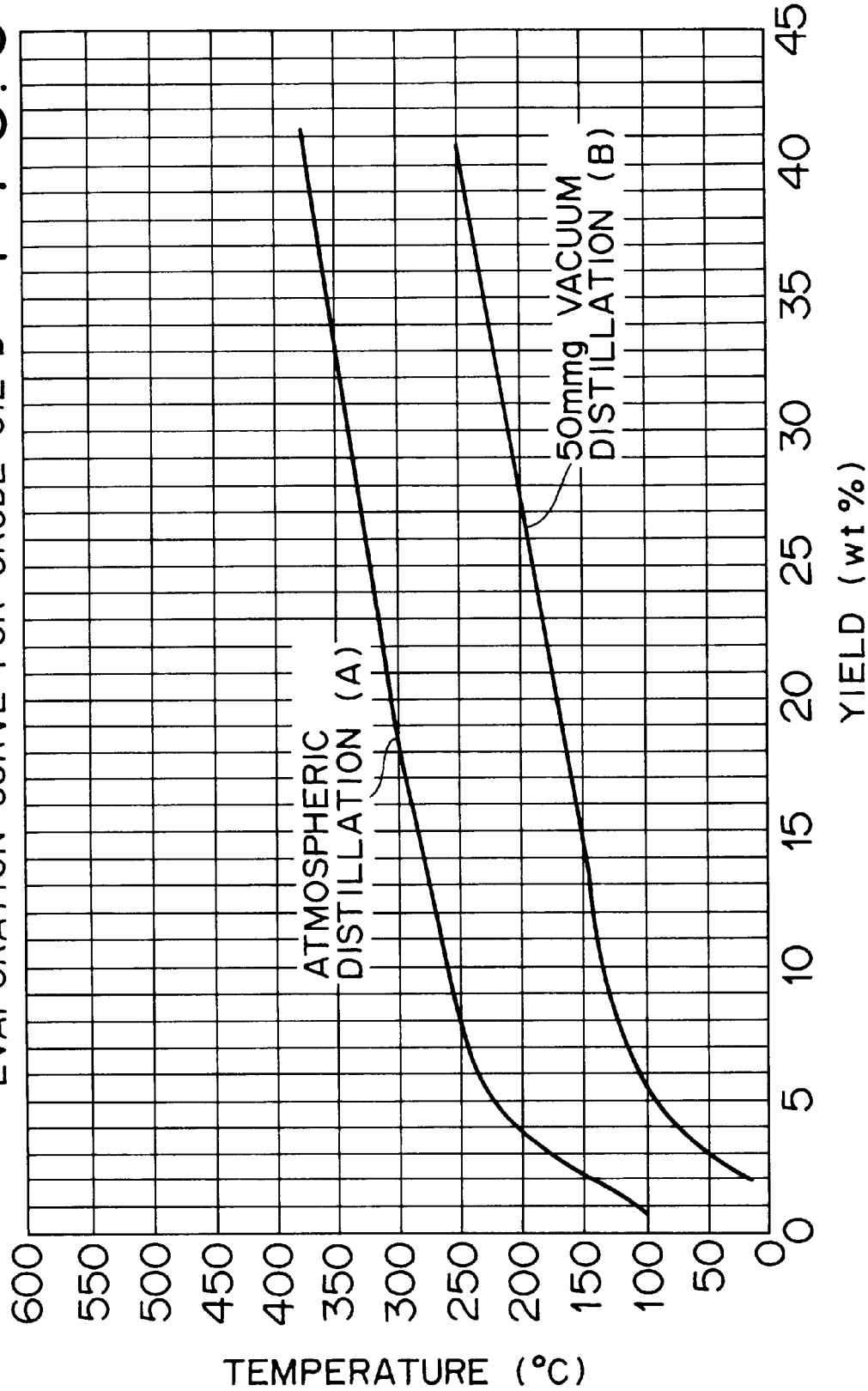

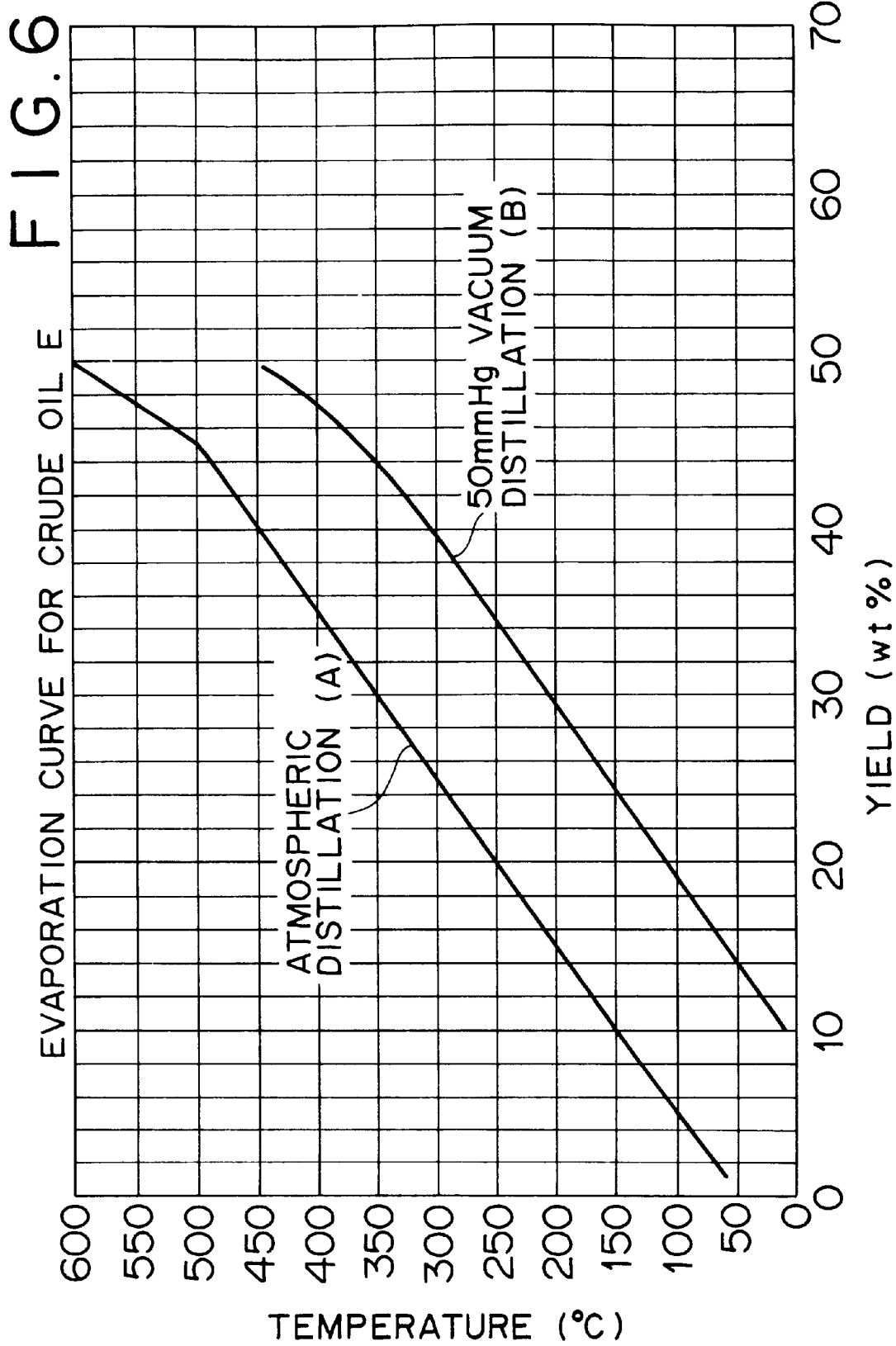

HIGH-EFFICIENCY POWER GENERATING METHOD

BACKGROUND OF THE INVENTION

Field of the Invention

The present invention relates to a high-efficiency power generating method.

In recent years, fractional distillation of crude oil or heavy oil in an electric power generating plant has been studied. A light oil fraction (low boiling point component) obtained by fractional distillation is sent to a gas turbine, and is burned therein, by which electric power is generated. High-temperature combustion exhaust gas obtained by the gas turbine is sent to a boiler in place of air, a heavy oil fraction (high boiling point component) is burned in the boiler, and a steam turbine is rotated by high-temperature, high-pressure steam produced in the boiler, by which electric power is generated. That is to say, a method is provided in which electric power is generated while what is called repowering, in which exhaust gas of a gas turbine is charged into a boiler and is re-burned, is performed.

As means for distilling crude oil or heavy oil, atmospheric distillation has generally been used, in which crude oil or heavy oil is distilled by being heated to about 360° C. As means for heating, a heating furnace has been used to obtain the above-described heating temperature. The heating furnace generally burns fuel to obtain thermal energy, and heats stock oil by radiation heat generated during burning and by convection of combustion gas.

The use of such a heating furnace allows the crude oil or heavy oil to be heated easily to a high temperature. When such a heating furnace is used, however, there arise problems such that heat loss of exhaust gas is created, the thermal efficiency is low, and treatment of SOx and NOx in exhaust gas is needed.

SUMMARY OF THE INVENTION

The present invention has been made in view of the above situation, and accordingly an object thereof is to provide a high-efficiency power generating method in which a heating furnace is disused, so that a problem of heat loss of exhaust gas is solved, and no load for treatment of SOx and NOx in exhaust gas is added to a power generating system, whereby the power generating efficiency of an exhaust gas re-combustion system is further enhanced as a whole.

Accordingly, the present invention provides a high-efficiency power generating method to generate electric power by an exhaust gas re-combustion system using at least a gas turbine, a boiler, and a steam turbine, comprising the steps of heating crude oil or heavy oil with steam obtained from the boiler; distilling the crude oil or heavy oil under reduced pressure; and generating electric power by using an obtained light oil fraction as a gas turbine fuel and by using a heavy oil fraction as a boiler fuel.

In accordance with the present invention, the crude oil or heavy oil can be heated easily by providing means for effecting heat exchange between the crude oil or heavy oil and the light oil fraction and/or heavy oil fraction obtained in a distillation column.

Also, in accordance with the present invention, a steam ejector can be used as means for reducing the pressure for vacuum distillation.

The present invention provides a high-efficiency power generating method in which a heating furnace is disused, so that a problem of heat loss of exhaust gas is solved, and no load for treatment of SOx and NOx in exhaust gas is added to a power generating system, whereby the power generating efficiency of an exhaust gas re-combustion system is further enhanced as a whole.

BRIEF DESCRIPTION OF THE DRAWING

Embodiments in accordance with the present invention will be described below with reference to the accompanying drawings.

FIG. 2 is a graph showing an evaporation curve for crude oil A in a vacuum distillation column in the high-efficiency power generating method in accordance with the present invention, making comparison with an evaporation curve for the crude oil A in a conventional atmospheric distillation column;

FIG. 3 is a graph showing an evaporation curve for crude oil B in a vacuum distillation column in the high-efficiency power generating method in accordance with the present invention, making comparison with an evaporation curve for the crude oil B in a conventional atmospheric distillation column;

FIG. 4 is a graph showing an evaporation curve for crude oil C in a vacuum distillation column in the high-efficiency power generating method in accordance with the present invention, making comparison with an evaporation curve for the crude oil C in a conventional atmospheric distillation column;

FIG. 5 is a graph showing an evaporation curve for crude oil D in a vacuum distillation column in the high-efficiency power generating method in accordance with the present invention, making comparison with an evaporation curve for the crude oil D in a conventional atmospheric distillation column; and FIG. 6 is a graph showing an evaporation curve for crude oil E in a vacuum distillation column in the high-efficiency power generating method in accordance with the present invention, making comparison with an evaporation curve for the crude oil E in a conventional atmospheric distillation column.

DETAILED DESCRIPTION OF THE PREFERRED EMBODIMENT

Figure 1:
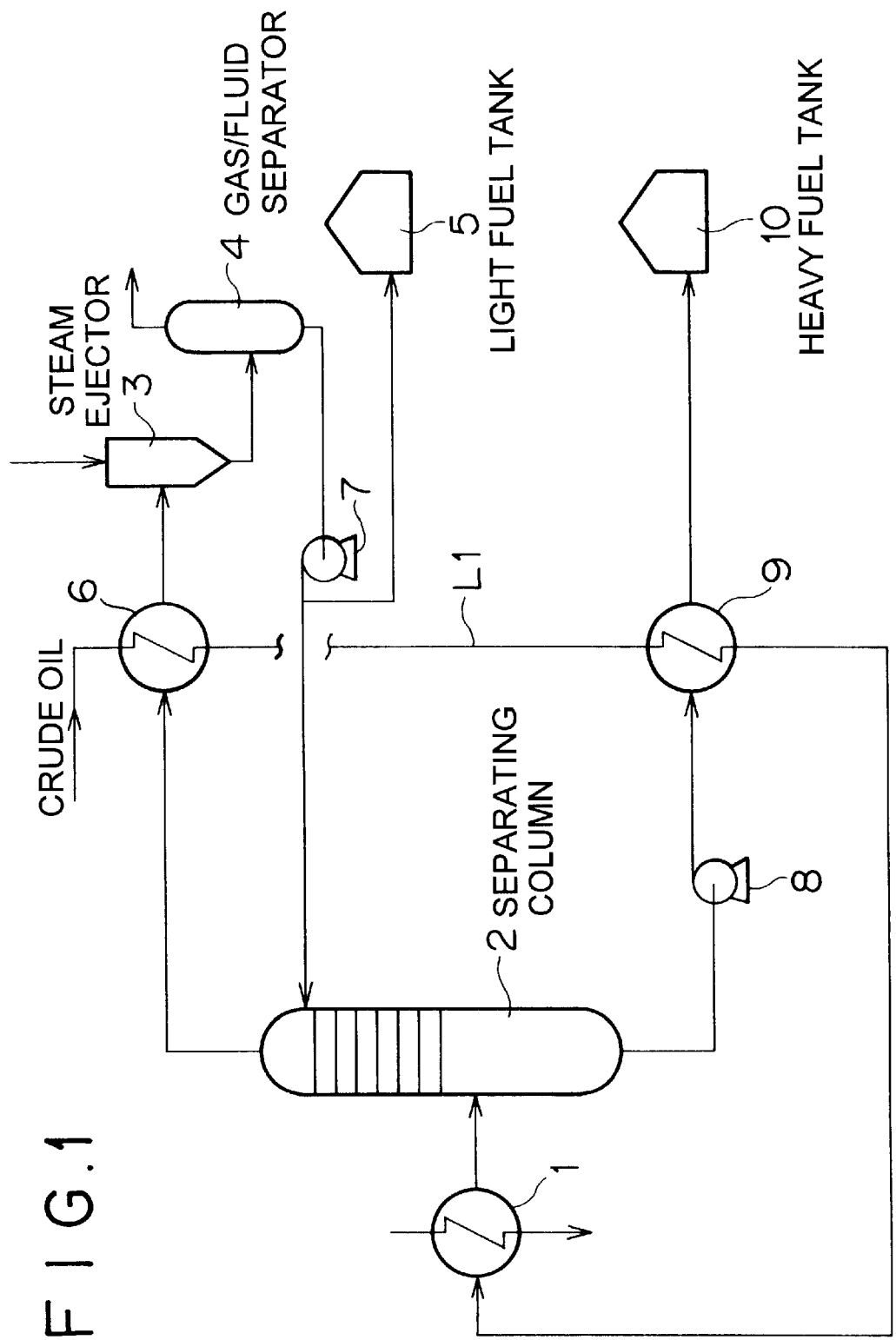
FIG. 1 is a schematic view showing the outline of one embodiment of a system for separating crude oil or heavy oil by distillation, of systems for carrying out a high-efficiency power generating method in accordance with the present invention by using an exhaust gas re-combustion system.

A high-efficiency power generating method in accordance with the present invention will now be described with reference to an embodiment shown in the accompanying drawings.

FIG. 1 is a schematic view showing the outline of one embodiment of a system for separating crude oil or heavy oil by distillation, of systems for carrying out a high-efficiency power generating method in accordance with the present invention by using an exhaust gas re-combustion system.

A distillation apparatus in accordance with this embodiment includes a heater 1, a vacuum distillation column 2, and a steam ejector 3.

The heater 1, which is means for heating crude oil or heavy oil, heats crude oil or heavy oil by heat exchange between steam and crude oil or heavy oil. The steam is supplied from a boiler (not shown). The steam obtained from the boiler is sent to a steam turbine to rotate the same, by which electric power is generated. The steam supplied to the heater 1 is one that has once rotated the steam turbine to generate electric power. Usually, the steam having a temperature of about 600° C. is supplied to the steam turbine, and after power generation, the pressure and temperature thereof turn to about 20 kg/cm²G and about 200 to 230° C., respectively. The heater 1 is supplied with the steam having a pressure of about 20 kg/cm²G and a temperature of about 200 to 230° C.

The vacuum distillation column 2 is an apparatus for distilling crude oil or heavy oil under reduced pressure. The vacuum distillation column 2 is generally provided with a multi-tier tray, and a light oil fraction and a heavy oil fraction accumulate at the upper and lower parts thereof, respectively.

The steam ejector 3, which is an apparatus for reducing the pressure in the vacuum distillation column 2, sucks gas in the distillation column by causing steam to flow at a high flow velocity, so that the pressure in the vacuum distillation column 2 is reduced to a value lower than the atmospheric pressure.

Next, one embodiment of a method for generating electric power with high efficiency by carrying out the present invention will be described using the system in accordance with the embodiment shown in FIG. 1.

Crude oil or heavy oil supplied as a fuel to a power station passes through the heater 1 through a supply line L1, and is supplied to the vacuum distillation column 2. As described above, the heater 1 is supplied with steam that has once rotated the steam turbine to generate electric power. This steam, having a pressure of about 20 kg/cm²G and a temperature of about 200 to 230° C., heats the crude oil or heavy oil flowing in the heater 1 to a temperature of about 200° C.

The interior of the vacuum distillation column 2 is decompressed by the sucking operation of the steam ejector 3. In the vacuum distillation column 2 having a reduced pressure (50 mmHg), the crude oil or heavy oil is distilled, and the light oil fraction evaporates efficiently even at the temperature of about 200° C. The light oil fraction and the heavy oil fraction are separated to the upper and lower parts of the vacuum distillation column 2, respectively.

As shown in graphs of FIGS. 2 to 6 showing evaporation curves for crude oils A to E (A to E denote the classification of crude oil producing area), the boiling point of component lowers under reduced pressure, and the evaporation curve shifts from (A) to (B). Even at the temperature of about 200° C., evaporation, condensation, and fractional distillation are effected efficiently.

Sodium, vanadium, potassium, and other components, which are harmful to a gas turbine, should naturally be excluded from the light oil fraction. By distilling the crude oil or heavy oil as shown in the present invention, the components such as sodium, vanadium, and potassium do not evaporate, so that they do not intrude into the light oil fraction. Therefore, the light oil fraction can provide a good-quality gas turbine fuel.

The light oil fraction is transferred to a separation tank 4 in such a manner as to be sucked by the steam ejector 3, and is separated into a gas component and a liquid component in the separation tank 4. The liquid component, which is the light oil fraction, is sucked from the bottom portion of the separation tank 4 by a pump 7. Some thereof recirculates to the upper part of the vacuum distillation column 2, and the remainder thereof is stored in a storage tank 5. The gas component is taken out from the upper part of the separation tank 4. The light oil fraction is subjected to heat exchange with the crude oil or heavy oil by using a heat exchanger 6 during the time when it is sucked by the steam ejector 3, by which the crude oil or heavy oil is heated.

The heavy oil fraction sucked from the bottom portion of the vacuum distillation column 2 by a pump 8 is stored in a heavy oil fraction storage tank 10. The heavy oil fraction sucked by the pump 8 passes through a heat exchanger 9 on the way to the storage tank 10, so that heat exchange with the crude oil or heavy oil is effected, by which the oil is heated.

The light oil fraction and the heavy oil fraction stored in the storage tanks 5 and 10, respectively, are taken out as necessary for the use as fuel. In some systems, the light oil fraction and the heavy oil fraction can be sent directly to a later-stage power generating process without passing through the storage tank.

The light oil fraction is used as a gas turbine fuel, and the heavy oil fraction is used as a boiler fuel. The burning of boiler fuel using the combustion exhaust gas of the gas turbine in which about 13 vol % or more of oxygen remains does not cause special hindrance to the combustion in the boiler. Since high-temperature thermal energy of about 580° C. that the combustion exhaust gas of the gas turbine has can be used effectively in the boiler, the fuel for the boiler can be saved. The amount of power generation can be increased as a whole, and the power generating efficiency per fuel can also be improved. That is to say, repowering can be performed.

Further, according to the power generating method in accordance with this embodiment, steam that is originally present in the power station is used effectively, and also there are not problems of heat loss of exhaust gas and addition of a load for treatment of SOx and NOx in exhaust gas because no heating furnace is used. That is to say, the power generating efficiency of the exhaust gas re-combustion system is further enhanced as a whole.

Although the present invention has been described with reference to the embodiment shown in FIG. 1, it is not limited to this embodiment. All modifications, changes, and additions that are easily made by a person skilled in the art are embraced in the technical scope of the present invention. In the preferred embodiment of FIG. 1, the vacuum distillation column 2 has a reduced pressure of 50 mmHg. However, this reduced pressure may vary from 30 mmHg to 500 mmHg depending on the conditions.

The disclosure of Japanese Patent Application No. 11-254242 filed on Sep. 8, 1999 including specification, claims, drawings, and summary incorporated herein by reference with its entirety.

What is claimed is:

1. A high-efficiency power generating method to generate electric power by an exhaust gas re-combustion system using at least a gas turbine, a boiler, and a steam turbine, comprising the steps of:
   heating crude oil or heavy oil with steam obtained from said boiler;
   distilling said crude oil or heavy oil under reduced pressure; and
   generating electric power by using an obtained light oil fraction as a gas turbine fuel and by using a heavy oil fraction as a boiler fuel.

2. The high-efficiency power generating method according to claim 1, wherein heat exchange is effected between said crude oil or heavy oil and either said light oil fraction or heavy oil fraction obtained by distilling said crude oil or heavy oil under reduced pressure or both said light oil fraction and heavy oil fraction, whereby said crude oil or heavy oil is heated.

3. The high-efficiency power generating method according to claim 1 or 2, wherein a steam ejector is used as means for reducing the pressure for vacuum distillation.

* * * * *

UNITED STATES PATENT AND TRADEMARK OFFICE
CERTIFICATE OF CORRECTION

PATENT NO. : 6,381,943 B1
DATED : May 7, 2002
INVENTOR(S) : Masaki Iijima et al.

It is certified that error appears in the above-identified patent and that said Letters Patent is hereby corrected as shown below:

<u>Title page,</u>
Item [75], should read:
-- [75] Masaki Iijima; Kazuto Kobayashi; Masayuki Moriwaki; Masatoshi Shibata; Yoshinori Hyakutake, all of Tokyo (JP) --

Signed and Sealed this

Fourth Day of February, 2003

JAMES E. ROGAN
*Director of the United States Patent and Trademark Office*